United States Patent
Kaszian

(10) Patent No.: US 11,402,107 B2
(45) Date of Patent: Aug. 2, 2022

(54) DEVICE FOR CLIMATE CONTROL OF A BUILDING AND METHOD FOR THIS PURPOSE

(71) Applicant: LISICORP AG, Teufen AR (CH)

(72) Inventor: Peter Kaszian, Munich (DE)

(73) Assignee: LISICORP AG

( * ) Notice: Subject to any disclaimer, the term of this patent is extended or adjusted under 35 U.S.C. 154(b) by 0 days.

(21) Appl. No.: 15/558,546

(22) PCT Filed: Mar. 16, 2015

(86) PCT No.: PCT/EP2015/055398
§ 371 (c)(1),
(2) Date: Sep. 14, 2017

(87) PCT Pub. No.: WO2016/146156
PCT Pub. Date: Sep. 22, 2016

(65) Prior Publication Data
US 2018/0051899 A1    Feb. 22, 2018

(51) Int. Cl.
*F24F 5/00* (2006.01)
*F24S 20/66* (2018.01)

(52) U.S. Cl.
CPC ............ *F24F 5/0075* (2013.01); *F24S 20/66* (2018.05); *F24F 2005/0053* (2013.01); *F24F 2005/0057* (2013.01); *F24F 2005/0082* (2013.01); *Y02A 30/00* (2018.01); *Y02B 10/40* (2013.01); *Y02B 30/90* (2013.01)

(58) Field of Classification Search
CPC .... F24F 5/0075; F24F 5/0046; F24F 2005/00; F24F 2005/0053; F24F 2005/0057; F24F 2005/0082; F24S 20/66; Y02B 10/40; Y02B 30/90; Y02A 30/00
See application file for complete search history.

(56) References Cited

U.S. PATENT DOCUMENTS

| 4,000,850 A | 1/1977 | Diggs | |
|---|---|---|---|
| 2011/0192393 A1* | 8/2011 | Swift | F24S 10/72 |
| | | | 126/663 |
| 2014/0075859 A1* | 3/2014 | Harkins | F24S 20/66 |
| | | | 52/169.11 |

FOREIGN PATENT DOCUMENTS

| CH | 703760 A | 3/2012 | |
|---|---|---|---|
| DE | 102013021773 A | 6/2014 | |
| DE | 102013021773 A1 * | 6/2014 | F24F 5/001 |
| EP | 1619444 A | 1/2006 | |

(Continued)

OTHER PUBLICATIONS

International Preliminary Report on Patentability for PCT/EP2015/055398 dated Sep. 28, 2017, 6 pages. English translation provided.

(Continued)

*Primary Examiner* — Edelmira Bosques
*Assistant Examiner* — Dana K Tighe
(74) *Attorney, Agent, or Firm* — Procopio, Cory, Hargreaves & Savitch LLP

(57) ABSTRACT

A device for climate control of a building (20), in which flatly formed external temperature elements (5) at least partially cover an outer side of the building (20), wherein the external temperature-control elements (5) are settable to a predefinable temperature value. Furthermore, a temperature-control element (5) and a method for climate control of a building (20) are specified.

13 Claims, 2 Drawing Sheets

(56) References Cited

FOREIGN PATENT DOCUMENTS

Figure 1:
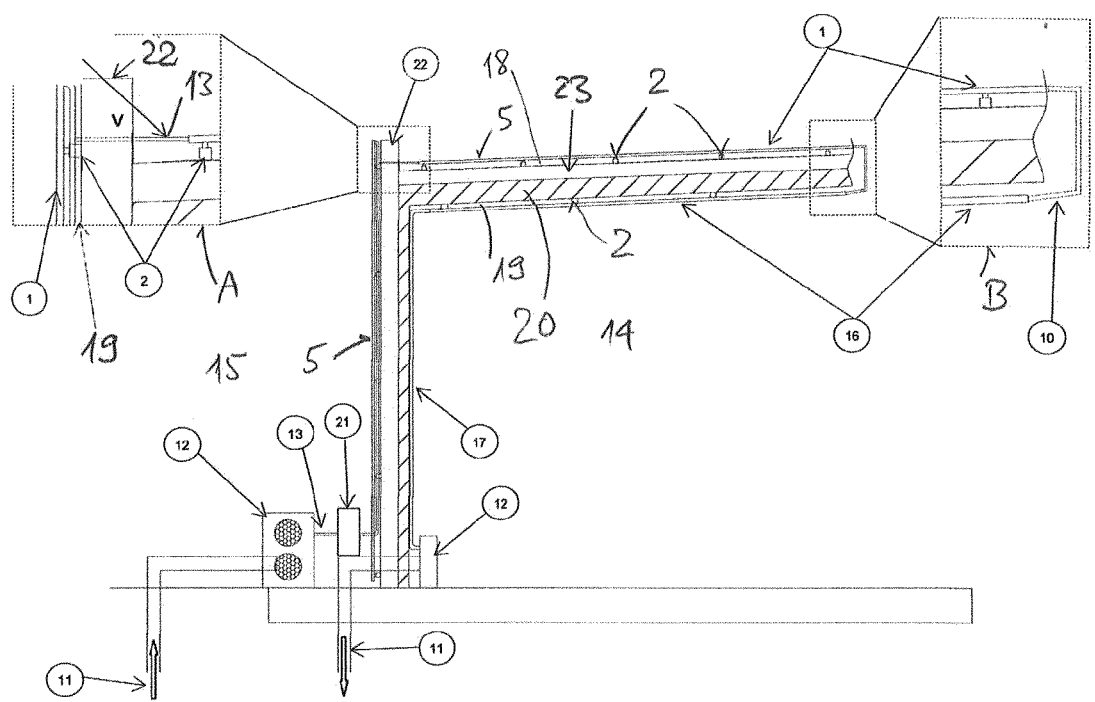

| | | |
|---|---:|---|
| EP | 1619444 A1 | 1/2006 |
| EP | 2146150 A | 1/2010 |
| JP | S6117861 A | 1/1986 |
| JP | 2008-164230 A | 7/2008 |
| KR | 10-2004-0071562 A | 8/2004 |

OTHER PUBLICATIONS

International search report for PCT/EP2015/055398 dated Nov. 27, 2015, 10 pgs.

* cited by examiner

DEVICE FOR CLIMATE CONTROL OF A BUILDING AND METHOD FOR THIS PURPOSE

The present application is a National Stage entry of PCT/EP2015/055398, filed on Mar. 16, 2015, the contents of which are incorporated by reference in its entirety.

The present invention relates to a device for climate control of a building according to the preamble of claim 1, a temperature-control unit for use in the device according to the preamble of claim 14, and a method for climate control of a building according to the preamble of claim 15.

Since ancient times, humans have attempted to provide an optimum solution for a pleasant room climate in summer and in the warm regions with building climate control. The approaches are as old and varied as the problem itself.

An efficient solution, which is very costly and presents a health risk, however, is the use of climate control systems, which do represent a solution which can be regulated and influenced, but at the cost of an actually pleasant room climate. Other approaches, such as shading, sophisticated ventilation systems, evaporative cooling by roof greening or evaporation elements have the disadvantage of low efficiency and lack of regulation.

Moreover, known teachings for building air temperature control are known from DE 41 03 010 A1 and DE 10 2008 009 085 B4, wherein an airflow is also generated in these known teachings which—as in the case of climate control systems—is frequently perceived to be unpleasant.

The object of the present invention is therefore to provide a device for climate control of a building, which does not have the above-mentioned disadvantages.

This object is achieved by the features specified in the characterizing part of claim 1. Further embodiment variants of the device according to the invention, a temperature-control unit for use in the device, and a method for climate control of a building are specified in further claims.

The invention firstly relates to a device for climate control of a building. The device according to the invention is distinguished in that
  flatly formed external temperature-control elements at least partially cover an outer side of the building and
  the external temperature-control elements are settable to a predefinable temperature value.

In contrast to known climate control systems, the device according to the invention prevents a penetration of warm air into the building, which has to be blown out from the building again with high expenditure of energy during the use of climate control systems and thus also increases the external temperature around the building. Upon the use of the device according to the invention, the walls and the roofs of buildings are prevented from heating up and this heat is prevented from entering the interior of the building over a very long period of time and radiating outward. Thus, on the one hand, a pleasant room climate results in the building, on the other hand, due to the lack of thermal radiation outward, a more pleasant climate is also obtained around the building. In this manner, the higher temperature in the inner cities in comparison to outlying regions is reduced.

One embodiment variant of the device according to the invention is that
  flatly formed internal temperature-control elements at least partially cover an inner side of the building and
  the inner temperature-control elements are settable to a predefinable temperature value.

Further embodiment variants of the device according to the invention are that at least one temperature-control unit is provided and a distribution system is provided, which is operationally connected to at least one temperature-control element and the at least one temperature-control unit, and a temperature-control medium is provided in the distribution system, using which the predefined temperature value is settable in the at least one temperature-control element.

Still further embodiment variants of the device according to the invention are that the temperature-control medium has at least one of the following properties:
  liquid;
  at least proportionally consists of water;
  freezing point below 0° C., preferably below 5° C.;
  gaseous;
  at least proportionally consists of air.

The efficiency can be significantly increased and the heat absorption can be regulated by means of control of the flow speed of the temperature-control medium, in particular by the use of a low-temperature temperature-control medium—for example, in a temperature range of 4° C. to 5° C. The use of the liquid heated by the external temperature to 17° C. to 18° C. in the interiors as ceiling or wall cooling ensures the further reduction of the internal temperature, which is influenced by internal heat sources.

Further embodiment variants of the device according to the invention are that the temperature-control elements cover at least 50%, preferably at least 80% of the outer side and/or the inner side.

Further embodiment variants of the device according to the invention are that the external temperature-control elements are arranged spaced apart in relation to the building outer side, so that a first intermediate space results between building outer side and external temperature-control element.

Further embodiment variants of the device according to the invention are that the internal temperature-control elements are arranged spaced apart in relation to the building inner side, so that a second intermediate space results between building inner side and internal temperature-control element.

Further embodiment variants of the device according to the invention are that a climate envelope encloses the outer side of the building with the exception of windows and doors, wherein the external temperature elements are integrated into the climate envelope.

Further embodiment variants of the device according to the invention are that a corrosion-proof metal layer is provided on the surface of the temperature-control elements oriented toward the building.

Further embodiment variants of the device according to the invention are that the temperature-control elements consist of a film, through which the temperature-control medium can be conveyed in multiple applied paths from an inlet opening to an outlet opening.

Further embodiment variants of the device according to the invention are that an insulation layer exists, which at least covers the external temperature-control elements on the outer side thereof, wherein the insulation layer is preferably covered from the outside using a corrosion-proof cover.

Further embodiment variants of the device according to the invention are that the corrosion-proof metal layer has a surface-enlarging structure on the surface of the temperature-control elements oriented toward the building.

Further embodiment variants of the device according to the invention are that temperature-control medium discharged from a temperature-control unit firstly flows through external temperature-control units and then internal temperature-control units.

Furthermore, a temperature-control unit according to the invention for use in a device for climate control of a building is specified. The temperature-control unit according to the invention is distinguished in that at least one inlet opening and at least one outlet opening are provided, wherein a temperature-control medium can move on a variety of paths from an inlet opening to an outlet opening.

Finally, a method for climate control of a building is specified, wherein the method according to the invention is distinguished in that

- at least regions of outer sides of the building are temperature controlled by circulating a temperature-control medium through flat external temperature-control elements which are provided on the outer side of the building,
- the temperature-control medium in temperature-control units is set to a predefined temperature value, and
- the temperature-control medium is supplied to the temperature-control elements via a distribution system.

One embodiment variant of the method according to the invention is that

- at least regions of inner sides of the building are temperature controlled by circulating the temperature-control medium through flat internal temperature-control elements, which are provided on the inner side of the building, and
- the temperature-control medium flows through the internal temperature-control elements after flowing through the external temperature-control elements.

It is to be expressly noted that the above-mentioned embodiment variants or combined embodiment variants can be combined in any desired manner. Only the combinations of embodiment variants which would result in a contradiction due to the combination are excluded.

Figure 2:
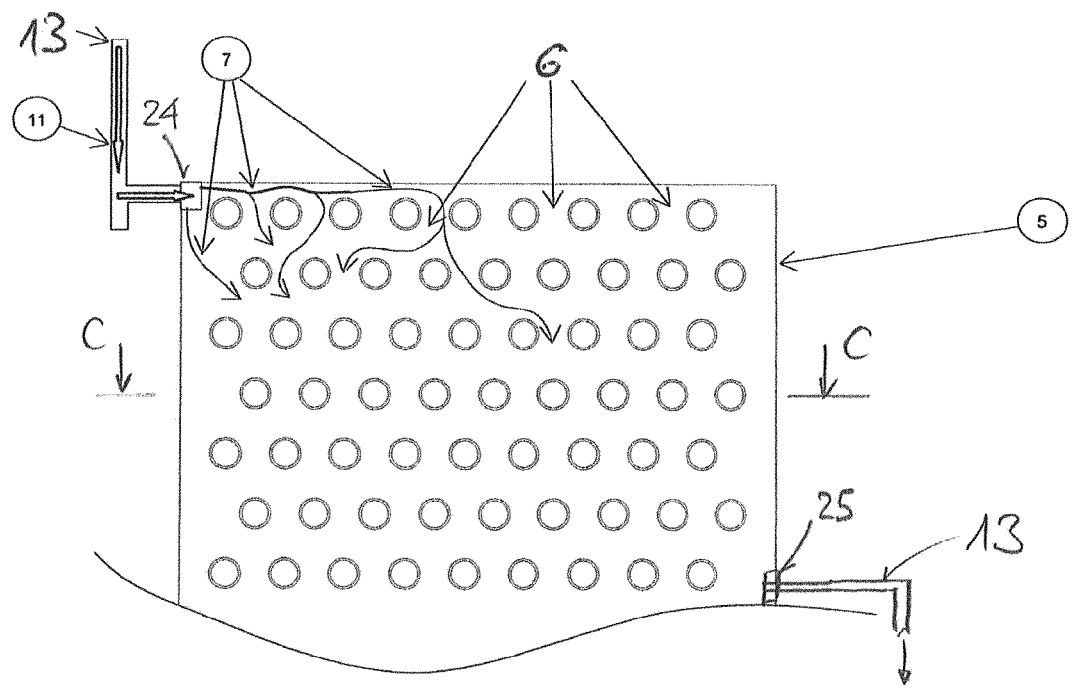
Figure 3:
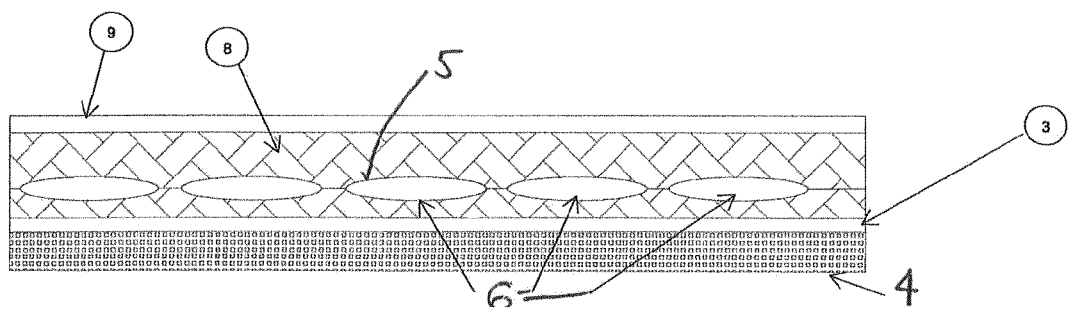

Exemplary embodiments of the present invention will be explained in greater detail hereafter on the basis of figures. In the figures:

FIG. 1 shows a section through a region of a building which is equipped with a device according to the invention for climate control, wherein two details A and B are shown enlarged, FIG. 2 shows a top view of a temperature-control element according to the invention having entry and exit openings for temperature-control medium, and FIG. 3 shows a section through a temperature-control element integrated into an insulation element according to one embodiment variant of the present invention.

FIG. 1 shows a section through a region of a building 20 having a roof structure 23 and a façade 22. According to the invention, a support construction 2 is provided on the building outer side—i.e., on the roof structure 23 and/or on the façade 22—which enables a spaced-apart installation of an external temperature-control element 5, wherein it is formed flatly and at least partially covers the outer side of the building 20. An intermediate space 18, which is also referred to hereafter, for example, as a first intermediate space 18, results between the external temperature-control unit 5 and the outer surface of the façade 22 and/or the roof structure 23 due to the spaced-apart installation. In order that the first intermediate space 18 is closed per se, the external temperature-control elements 5 form an actual climate envelope 1, which can comprise the entire building 20 in particular. This enables the temperature of the building 20, including façade 22 and roof structure 23, to be kept at a predefined temperature value.

The great advantage which is obtained by the present invention is illustrated by a simple computational example: if one presumes a building footprint of 100×100 m and a building height of 8 m, an enclosed building volume of 80,000 m$^3$ is thus obtained. In the case of a conventional building climate control, this building volume of 80,000 m$^3$ has to be actively cooled. However, if only the intermediate space is to be cooled, as is provided according to the invention, and one presumes that—again with identical building dimensions—the above-defined intermediate space has a depth of 5 cm, in the present invention, a volume to be cooled of only approximately 700 m$^3$ thus results, which is obviously substantially smaller than the conventional building climate control. The resulting possible savings in the energy costs to be applied for the cooling for a climate control according to the present invention are correspondingly large.

In a further embodiment variant of the device according to the invention, there is additionally an internal temperature-control element 16, 17, which is again flat and at least partially covers the inner side of the building 20. A second intermediate space 19 results between the internal temperature-control unit 16, 17 and the inner surface of the building 20 due to a spaced-apart installation by means of support construction 2.

In order that the second intermediate space 19 is also closed per se, the internal temperature-control elements 5 complete the climate envelope 1 around the building construction. This enables the temperature of the entire building 20, including façade 22 and roof structure 23, to be kept at a predefined temperature value. The requirements for optimum room climate control are thus also provided, because the temperature of a temperature-control medium 11 is set to a predefined value, wherein this is performed, for example, using a temperature-control unit 12. The temperature-control medium 11 is thereafter conducted through the external temperature-control elements 5, wherein a distribution system 10, 13 is provided for this purpose, which is connected to the temperature-control elements 5. The temperature-control medium 11, after leaving an external temperature-control element 5, is either conducted back to the temperature-control unit 12 via the distribution system 10, 13 or the temperature-control medium 11 is firstly supplied to the internal temperature-control elements 16, 17.

The temperature-control medium 11 has specific requirements depending on the respective application. In particular, the temperature-control medium 11 has at least one of the following properties:

- liquid;
- at least proportionally consists of water;
- freezing point below 0° C., preferably below 5° C.;
- gaseous;
- at least proportionally consists of air.

The two details A and B are each shown enlarged in FIG. 1. This relates to showing possible implementations of the distribution system in a corner region of a building 20 (detail A) or in a transition region from an external temperature-control element 5 to an internal temperature-control element 16, 17 (detail B).

Finally, there is an array of options for setting the temperature-control medium 11 to a predefined value. One option is shown in FIG. 1, in which filtered groundwater is used as the temperature-control medium 11. Since groundwater generally has a lower temperature, energy expenditures for the cooling are lower, since pre-cooling has already occurred. The temperature-control unit 12 is only necessary then if the temperature of the groundwater proves to be excessively high for the cooling. Only then is cooling of the temperature-control medium 11 using a conventional climate control device necessary.

In a specific application, it has been shown that the temperature-control medium 11 has to be cooled to a temperature of 4° C. to 5° C. The temperature-control medium 11, which is distributed via the distribution system 10, 13 and conducted through the external temperature-control elements 5, has then warmed up to a temperature of 17° C. to 18° C. The temperature-control medium 11 in this temperature range is preferably suitable for direct introduction into the internal temperature-control elements 16, 17 and subsequently return to the temperature-control unit or return into the groundwater. Pleasant climatic conditions could thus be provided in the interior 14.

In a further embodiment variant of the present invention, alternatively or additionally to the regulation of the temperature of the temperature-control medium 11, the setting of the climatic conditions in the interior 14 is performed via the flow speed of the temperature-control medium 11. For this purpose, a control unit 21 is provided, which comprises a controllable pump for the temperature-control medium 11.

As already explained, FIG. 1 shows an intermediate space in each case both on the outer side and also on the inner side of the building 20. However, it is also conceivable that the temperature-control elements 5, 16, 17 are arranged directly on the façade 22 and/or on the roof structure 23. An intermediate space between building components and the temperature-control elements is indicated in particular, however, if the temperature-control medium 11, and as a result thereof also the surfaces of the temperature-control elements, are strongly cooled, as is the case in the above-mentioned example, for example. Thus, in the event of high temperature differences, condensation water will accumulate on the surfaces of the temperature-control elements, which can result in moisture damage on the building 20 or on the climate envelope 1.

In a further embodiment variant of the present invention, it is therefore proposed that condensation water which forms on the temperature-control elements be discharged intentionally. A collection system for condensation water is accordingly provided (not shown in FIG. 1), whereby it is ensured that no damage can occur on the building 20.

FIG. 2 shows a top view of an embodiment variant of a temperature-control element 5 according to the invention. There are two films in this case, which have spot weld points, which hold together the two films. The temperature-control medium 11, which enters through an entry opening 24 into the temperature-control element 5, is conveyed through the weld points on various paths 7 to an exit opening 25. A variety of paths are therefore available to the temperature-control medium 11 from the entry opening 24 to the exit opening 25, whereby an optimum temperature distribution is obtained in the temperature-control element 5.

FIG. 3 shows a section through a sectional plane C-C indicated in FIG. 2 through a temperature-control element 5, wherein further layers are also visible in addition to the actual temperature-control element 5. The temperature-control element 5 is thus integrated into an insulation layer 8, which is covered toward the outside using a corrosion-proof cover 9, using which the components located underneath are protected from external influences such as water, snow, UV radiation, or the like.

On the opposite side of the insulation layer 8, a corrosion-proof metal layer 3 is provided, which prevents a penetration of condensation water into the insulation layer 8. In one embodiment of the present invention, as shown in FIG. 3, adjoining the corrosion-proof metal layer 3, a surface-enlarging structure 4 is visible, which promotes the flow of heat and/or cold from the temperature-control element 5 to the surroundings—in particular in the intermediate space if such an intermediate space is provided.

Further aspects of the method according to the invention are explained in greater detail hereafter:

The invention relates to a method for cooling building surfaces on the outside by way of a climate envelope, which, when applied to the external surfaces of the building, prevents the heating of the building surfaces—for example, façades 22 and roof structure 23—due to the thermal radiation of the sun. The climate envelope 1 consists of multiple layers, which are either installed as individual elements or as a flat construction and consists as components of a support construction 2, which is permanently connected to the building as a frame for accommodating the temperature-control elements or the flat construction, a corrosion-proof metal layer 3, which is provided with a corrosion-proof surface-enlarging structure 4 which is enlarged in the direction of the building envelope, a liquid supply, which is provided with a structure which ensures a redundant flow property (identified in FIG. 2 by the flow path 7), an insulation layer 8, and a weatherproof and corrosion-proof cover 9, which protects lower components from the external influences such as water, snow, UV radiation, or the like. The cooling of the building surfaces is performed by a closed coolant liquid loop 10, by cooling the temperature-control medium 11, for example, to a temperature of 4° C. to 5° C. and conducting it via a distribution system 13 into the temperature-control elements 5 of the climate element 1 and the temperature of the outside air between the building envelope 1 and the climate envelope 1—i.e., in the first and/or second intermediate space 18, 19—significantly decreasing due to the cooling of the corrosion-proof metal layer 3.

As already mentioned, filtered groundwater can be used as the temperature-control medium as a liquid, whereby the pre-cooled groundwater results in a lower energy consumption. The heated water can subsequently be conducted back into the ground.

In a further embodiment variant of the method according to the invention, the temperature-control medium for the further cooling of the inner spaces 14 is conducted at a temperature of 17° C.-18° C. into a system for sealing and/or wall cooling elements—i.e., into the internal temperature-control elements 16, 17.

In still a further embodiment variant of the method according to the invention, the water condensed on the enlarged surface of the corrosion-proof metal layer 3 is conducted via a collection system into a collection basin as utility water.

In still a further embodiment variant of the method according to the invention, the flow speed of the temperature-control medium 11 is influenced by means of control unit 21.

Finally, in still a further embodiment variant of the method according to the invention, a sol or another liquid having a freezing point of significantly below 0° C. is used as the temperature-control medium 11, whereby it can be cooled in the temperature-control unit 12 to temperatures below 0° C.

The invention claimed is:
1. A device for climate control of a building (20), wherein the device comprising:
flatly formed external temperature-control elements (5) at least partially cover an outer side of the building (20), the external temperature-control elements (5) are settable to a predefinable temperature value, the external temperature-control elements (5) are arranged spaced apart in relation to the building's outer side so that a first gap (18) is between the building's outer side and the external temperature-control elements (5), wherein the first gap is not in fluid communication with an inner side of the building, and a collection basin, wherein condensation water accumulated on the external temperature-control elements (5) and within the first gap (18) collects in the collection basin.

2. The device according to claim 1, further comprising flatly formed internal temperature-control elements (16, 17) at least partially cover the inner side of the building (20) and the internal temperature-control elements (16, 17) are settable to a predefinable temperature value.

3. The device according to claim 2, wherein the temperature-control elements (5; 16, 17) cover at least 50%, preferably at least 80% of the outer side or the inner side, respectively.

4. The device according to claim 2, wherein the internal temperature-control elements (16, 17) are arranged spaced apart in relation to the building inner side, so that a second air gap (19) results between building inner side and internal temperature-control element (16, 17), wherein the second air gap is completely isolated from an inner side of the building.

5. The device according to claim 1, wherein at least one temperature-control unit (12) is provided and a distribution system (10, 13) is provided, which is operationally connected to at least one temperature-control element (5; 16, 17) and the at least one temperature-control unit (12), and a temperature-control medium (6, 11) is provided in the distribution system (10, 13), using which the predefined temperature value is settable in the at least one temperature-control unit (5; 16, 17).

6. The device according to claim 5, wherein the temperature-control medium (6, 11) has at least one of the following properties:

liquid;

at least proportionally consists of water;

freezing point below 0° C., preferably below 5° C.;

gaseous;

at least proportionally consists of air.

7. The device according to claim 6, wherein the temperature-control medium (6, 11) has a freezing point below 0° C., preferably below 5° C.

8. The device according to claim 5, wherein the temperature-control elements (5; 16, 17) consist of a film through which the temperature-control medium (6, 11) can be conveyed on multiple applied paths from an inlet opening (24) to an outlet opening (25).

9. The device according to claim 5, wherein there is an insulation layer (8), which at least covers the external temperature-control elements (5) on the outer side thereof, wherein the insulation layer (8) is preferably externally covered using a corrosion-proof cover (9).

10. The device according to claim 5, wherein the temperature-control medium (6, 11) discharged from a temperature-control unit (5; 16, 17) firstly flows through the external temperature-control units (5) and then internal temperature-control units (16, 17).

11. The device according to claim 1, further comprising a climate envelope encloses the outer side of the building (20) with the exception of windows and doors, wherein the external temperature-control elements (5) are integrated into the climate envelope.

12. The device according to claim 1, further comprising a corrosion-proof metal layer (3) is provided on the surface of the temperature-control elements (5; 16, 17) oriented toward the building (20).

13. The device according to claim 12, wherein the corrosion-proof metal layer (3) has a surface-enlarging structure (4) on the surface of the temperature-control elements (5; 16, 17) oriented toward the building (20).

* * * * *